United States Patent [19]

Ardeleanu

[11] 4,166,419
[45] Sep. 4, 1979

[54] PNEUMATICALLY PROPELLED RAILWAY CAR TRANSPORTATION SYSTEM

[75] Inventor: Stefan Ardeleanu, Bucharest, Romania

[73] Assignee: Institutul National Pentru Creatie Stiiutifica si Technica-"Increst", Bucharest, Romania

[21] Appl. No.: 811,677

[22] Filed: Jun. 30, 1977

[30] Foreign Application Priority Data

Jul. 20, 1976 [RO] Romania .................................. 87025

[51] Int. Cl.$^2$ ........................ B61B 3/00; B61B 13/10; B61B 15/00; B61F 13/00
[52] U.S. Cl. .................................. 104/138 R; 104/95; 104/155; 105/155; 105/156; 406/138
[58] Field of Search ........... 104/20, 95, 138 R, 138 G, 104/155; 105/2 R, 150, 154, 155, 156, 365; 243/32, 33, 39

[56] References Cited

U.S. PATENT DOCUMENTS

| | | | |
|---|---|---|---|
| 452,741 | 5/1891 | Weems | 105/2 R |
| 928,435 | 7/1909 | Felts | 105/156 X |
| 1,361,809 | 12/1920 | Berry | 105/155 X |
| 1,779,164 | 10/1930 | Grover | 243/39 |
| 3,568,605 | 3/1971 | Pettit | 105/156 X |
| 3,787,007 | 1/1974 | Alexanhrov et al. | 243/33 |
| 4,042,190 | 8/1977 | Veno | 243/39 |

*Primary Examiner*—Albert J. Makay
*Assistant Examiner*—Howard Beltran
*Attorney, Agent, or Firm*—Karl F. Ross

[57] ABSTRACT

A pneumatic transport system in which a transport tube is provided with an overhead rail in the form of an I-beam contained therein and a vehicle riding along the rail. The vehicle is formed by an elongated container suspended beneath the rail and displaceable therealong within the tube, with at least one vertical pivot mounted at an end of the container and a support mounted at an end of the container and a support mounted on the vertical pivot. A plurality of support rollers are mounted on the support and engage the lower flange of the rail while a plurality of guide rollers, also mounted on the support, flank the lower flange of the rail. Packing means provided at an end of the container enables the vehicle to be pneumatically displaced through the tube, the packing means being spaced from the wall of the tube and mounted on the vertical pivot for displacement in a horizontal plane by a pin provided on the support and engaged by a fork provided on the packing means.

4 Claims, 5 Drawing Figures

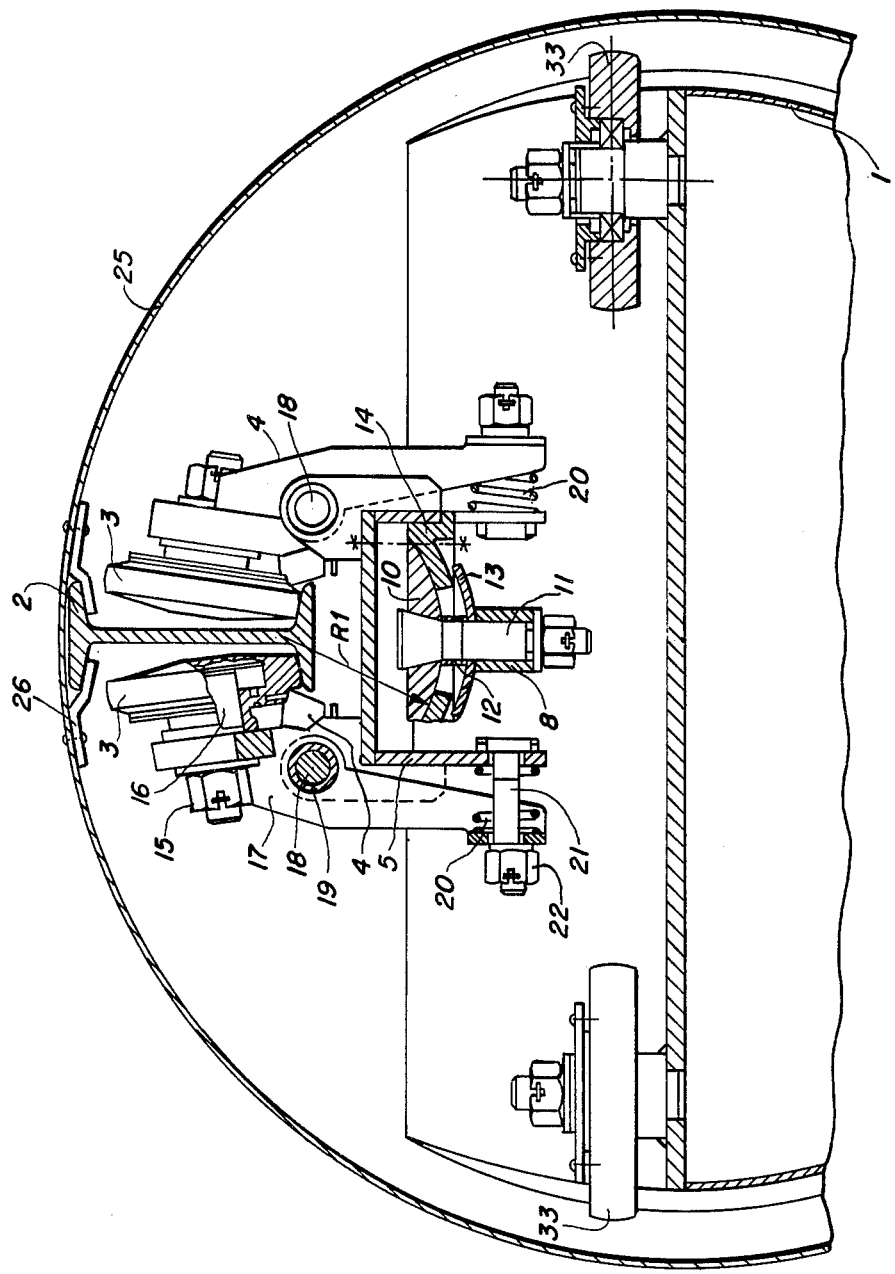
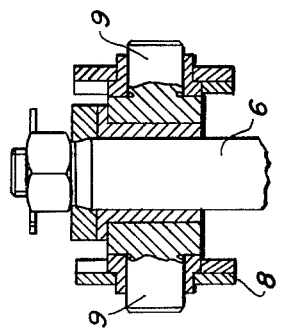
FIG. 3
FIG. 2

PNEUMATICALLY PROPELLED RAILWAY CAR TRANSPORTATION SYSTEM

FIELD OF THE INVENTION

The present invention relates to a heavy-duty container for pneumatically transporting various goods or materials within underground, aerial or joint pneumatic tube systems.

BACKGROUND OF THE INVENTION

A known type of container for the pneumatic transport of loads through tubes is provided at each end with a disk which is either rigid or movable against the body of the container and which supports driving rollers radially mounted on it.

This container has the drawback that, in spite of the large number of rollers it is provided with, at least three at each end, its weight is supported only by one or, at the most, by two rollers at each end. Thus, the carrying capacity of the container is limited by the allowable value of the pressure created at the contact between the rollers and the wall of transport tube.

In another known system for the transport of loads within tubes, the lifting of the rollers off the support rail in curves is limited by the addition to the usual rail of another rail placed above the rollers, thus creating a load torque when the containers ride on a curve.

This system has the drawback in that it does not ensure an even distribution of the carried load on the rollers, this being the cause of premature wear of the rollers and rail track.

OBJECTS OF THE INVENTION

It is therefore an object of the present invention to provide an improved pneumatic transport system in which all of the support rollers of the vehicle remain in contact with the supporting surface of the transport tube at all times.

It is another object of the present invention to provide an improved pneumatic transport system in which the weight of the load of the vehicle is evenly distributed to all of the support rollers.

SUMMARY OF THE INVENTION

The container according to the present invention obviates all of the above mentioned disadvantages, as it is provided at each end with at least two groups of four driving rollers each, with the rolling surfaces convexly shaped, which are mounted together with four guiding rollers each, on a movable support that is mounted in its turn on the body of the container by means of a vertical pivot having arms which rotate in a horizontal plane around the vertical pivot and in the vertical plane around another pivot, while on the free ends of the arms there are provided ball journals, on which are mounted the movable supports.

According to another feature of the present invention, the container is also provided with flexible packings which are mounted on a support that may be displaced around the vertical pivot of the container by a pin fastened to the movable support of the container and a fork mounted on the support of the packings.

BRIEF DESCRIPTION OF THE DRAWING

The above and other objects, features and advantages of the invention will become more readily apparent from the following description, reference being made to the accompanying drawing, in which:

FIG. 2 is a cross-sectional view taken along line II—II of FIG. 1;

FIG. 3 is a cross-sectional view taken along line III—III of FIG. 1;

SPECIFIC DESCRIPTION

Figure 1:
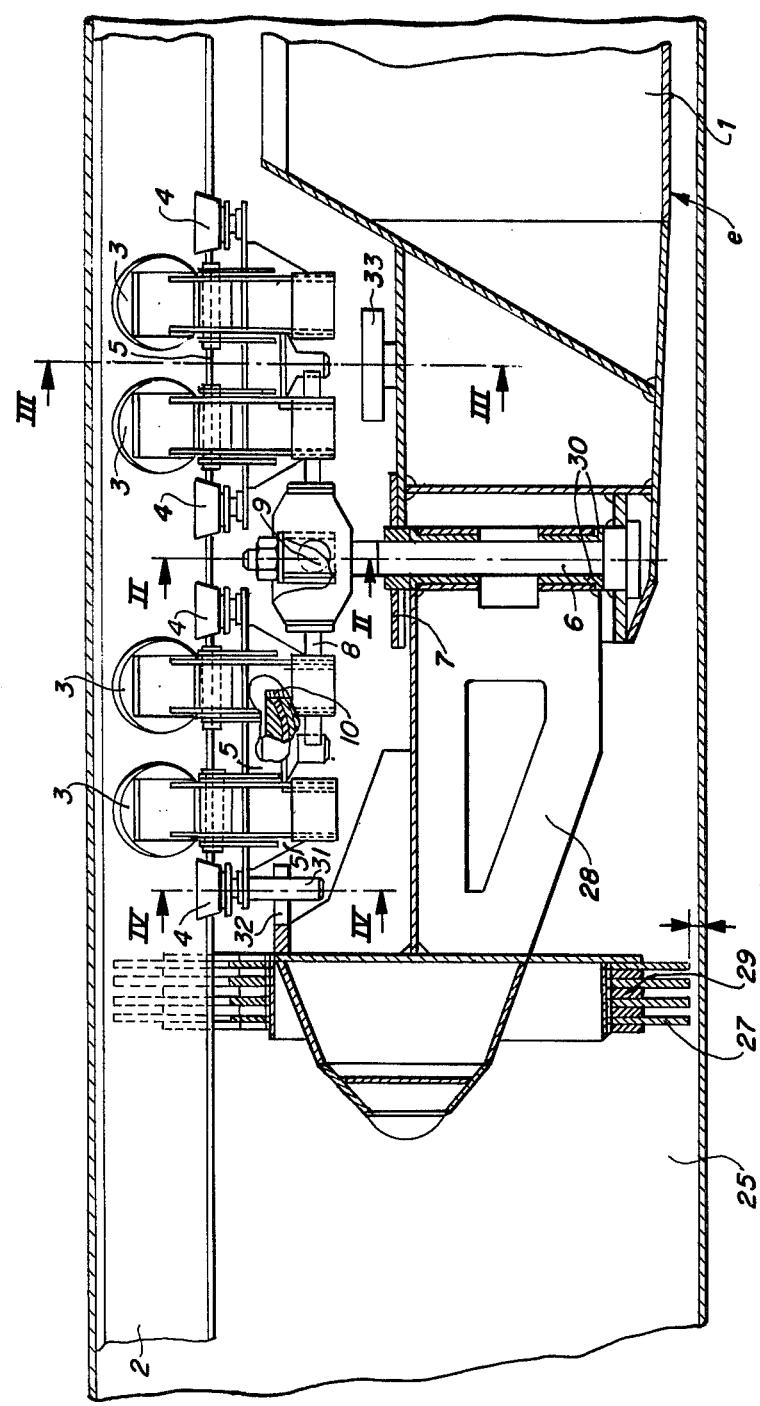
FIG. 1 is a longitudinal section taken through the transport tube and one end of the vehicle, the other end being mirror symmetrical thereto.
Figure 4:
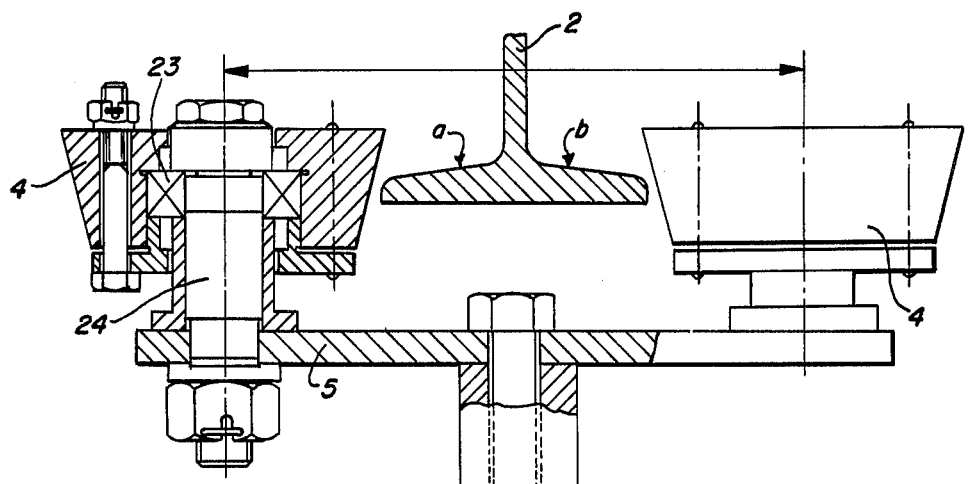
FIG. 4 is a cross-sectional view taken along line II—IV of FIG. 1.
Figure 5:
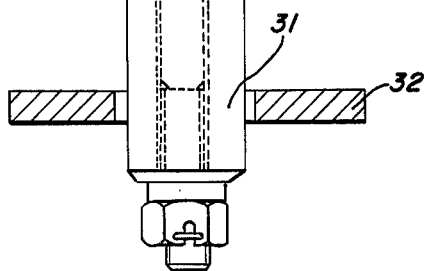
FIG. 5 is a cross-sectional view through the transport tube showing the vehicle in place therein.
Figure 5:
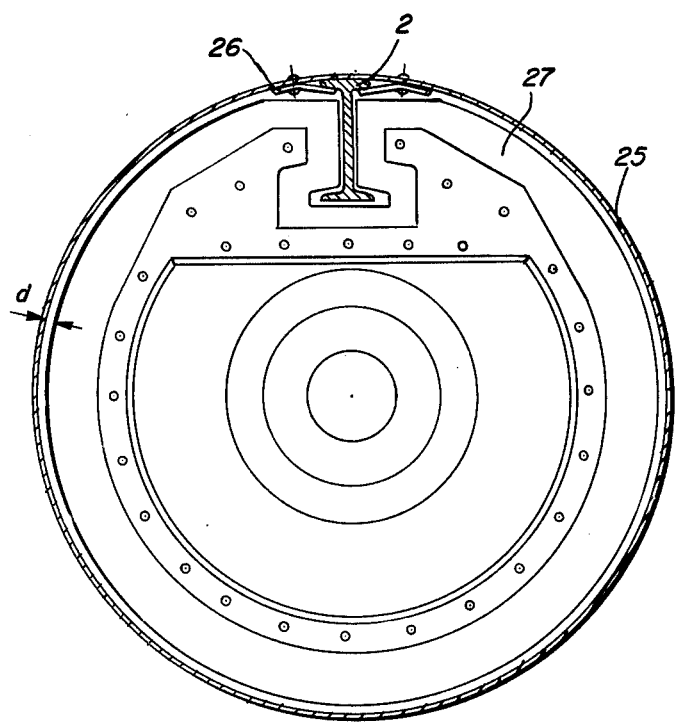

In accordance with the present invention, the vehicle shown in FIG. 1 consists of a container 1 that is supported by a rail 2 in the form of an I-beam, through the intermediary of support rollers 3, which flank the rail 2 and are guided and compelled to run on the two sides a and b of the lower flange of the rail 2 by the self-centering effect of the incline to the vertical of the support rollers 3. The container 1 is provided at each end with two groups of four driving rollers 3, which have their rolling surfaces convexly shaped, and with two groups of four guiding rollers 4 which are downwardly tapered and normally spaced from the edges of the lower flange of the rail 2, as shown in FIG. 4, except under heavier and heavier loads which will displace the vehicle downwardly, causing engagement of the flange by the guide rollers 4, taking into account the load limit each support roller 3 may carry. Each group of four support rollers 3 is mounted together with a group of four guiding rollers 4 on a movable support 5. Each end of the container 1 is suspended from the support rollers 3 by means of a vertical pivot 6, which is mounted on the container 1 by a flange 7, and is provided with arms 8, which may rotate in a horizontal plane around the vertical pivot 6 and in a vertical plane around another pivot 9, so as to allow an even distribution of the entire weight of the container 1, on all the support rollers 3, and to allow the support rollers 3 and the guiding rollers 4 to run properly on the rail 2, in curves and on unlevel portions of track. The supports 5 are mounted on the arms 8 through the intermediary of ball journals, which are formed by a spacing sleeve 12, a spherical cap 13 and a ball member 10, which is mounted by a bolt 11 to the ends of the arms 8.

The movable support 5 is formed with a spherical bearing 14 held between the cap 13 and member 10, as shown in FIG. 3. The spherical surface of the bearing 14 has a radius $R_1$ with its center placed in the center of the rectangle which is formed by the points of contact between the four support rollers 3 of the respective groups and the rail 2. Each spherical bearing 14 is fastened to the movable support 5 by means of screws. The support 3 is mounted with eight driving rollers at each end of the container, four on one side and four on the other side of the rail 2, these being supported two by two on each of the sides a and b of the lower flange.

Each of the above mentioned support rollers is mounted through the intermediary of nuts 15 and axles 16, fastened on a swinging body 17 by means of clamping sleeves, spacing pieces, washers, etc.

When an additional load is supported by the support rollers 3, the swinging body 17 swings around a pivot 18 on a clamping sleeve 19, compressing a spring 20. When the additional load is removed, the support rollers 3 and the swinging body 17 are returned to the initial position by the spring 20, this position being adjustable by a threaded bolt 21 and a screw nut 22.

The guiding rollers 4 are mounted with eight guiding rollers at each end of the container 1, four on one side and four on the other side of the rail 2, these being mounted two by two on either side of the lateral extremities a and b of the lower flange of rail 2.

The guiding rollers 4 are provided with a bearing 23 which is mounted on an axle 24, this axles, in turn, being fastened to the movable support 5.

The distance c between the axles of the guiding rollers 4 is chosen in such a way as to allow the rail 2 to pass between the guiding rollers with a clearance of a few millimeters, this being considered the optimum clearance that can be obtained to avoid friction but still allow engagement of the flange by the guide rollers 4 during heavy loading.

A covering layer of antifrictional material, for example teflon, or graphitiferous teflon, is applied to the spherical surfaces of the ball journal for the smooth operation thereof.

In a pneumatic transport system that uses containers which are built according to the present invention, the rail 2 may be mounted within a transport tube 25 by means of fasteners 26. In this case, the container is propelled in the interior of the transport tube due to the pressure difference produced between its end by means of exhaustors connected to the transport tube. The rail 2 may be mounted, as well on supports placed outside the transport tube within the loading and the unloading stations located at the ends of the tube.

The container continues to move on the kinetic energy it has acquired when leaving the transport tube, or, by any other means.

In order to be propelled in the interior of the transport tube 25 by means of a minimum pressure difference produced between its ends, the container is provided at each end with a number of packing elements 27, which are mounted on a packing support 28 by means of screws.

The packings 27 are made of a flexible material—rubber, for example, and are cut in such a way as to obturate as much as possible the cross section of the transport tube 25 and still to maintain a minimum distance d between the edge of the packings and the interior wall of the transport tube 25. Thus, when the container runs inside the transport tube 25, the packings 27 will not rub the inner surface of the transport tube 25 or the surface of the rail 2, which would increase its resistance to motion. The packings 27 are mounted at a certain distance one in front of another by means of spacers 29 so as to ensure almost a perfect airtightness due to the labyrinth effect thus produced.

As the container runs on the rail 2, which includes space curves, the packings 27 ensure a proper airtightness without increasing the resistance to motion, this due to the fact that the packing support 28 rotates around the vertical pivot 6 by the sleeves 30 mounted thereon, which form a part of the packing support. This support is driven to rotative motion by means of a pin 31, which is fastened to the movable support 5, and operates a fork 32 mounted on the packing support 28.

Both the lateral friction between the packings 27 and the transport tube 25, and the widening of the distance d located between the packing 27 and the interior wall of the transport tube are eliminated by the rotative motion of the packing support 28.

At each end of the container, there are two rollers 33 which are mounted on both sides of the container's body 1, i.e. in the median longitudinal plane of the container, by means of bearings and axles.

The rollers 33 are positioned so that any possible touching between the container's body and the inner wall of the transport tube 25 happens only through the intermediary of these rollers, obtaining a reduced resistance to motion.

The container's body 1 has the lower surface e elevated in such a way above the inner wall of the transport tube 25 so as not to touch the inner wall of the tube when the container runs inside this transport tube.

The operation of the container, according to the present invention, takes place as follows:

The container 1, fully loaded, with a total weight of several tons or more, runs inside the transport tube 25, and will continue to run on the rail 2 with a minimum resistance to motion and an even distribution of load on the support rollers 3, even if the rail 2 follows a route with curves and unlevel portions.

The direction of the resultant of all forces (weight, inertia, centrifugal force, etc.) crosses the spherical bearing 14, through the center of its spherical surface thus ensuring the stability of the support rollers 3 on the sides a and b of the lower flange of rail 2. Maximum mobility is ensured for the support rollers 3, due to the arms 8, provided with the ball journal. moreover, any possible shocks or additional loads on the support rollers 3 are damped by the spring 20 through the intermediary of the swinging body 17. The convex shape of the driving rollers 3 allows them to run on the surfaces a and b of the flange at a changing incline to the vertical without increasing the rollers' wear.

The inclined support rollers 4 orientate the movable support 5 on the rail 2 in such a way as to provide automatic centering of the vehicle within the transport tube 25, with a minimum of contact between the guide rollers and the tube and rail structure.

In order to obtain a transport line of maximum efficiency using pneumatic propulsion, the amount of air which escapes alongside the container must be as small as possible. With that end in view, the packings 27 together with the spacers 29 form a labyrinth and, as they are mounted on the rotatable support 28, they are always in a plan which is perpendicular to the axis of the transport tube 25, no matter what the shape of the route is, thus eliminating the lateral frictions and the widening of the gap d located between the packings 27 and the inner wall of the transport tube 25.

When the container is driven out of the transport tube 25 and the body of the container 1 is no longer supported by the support rollers 3 which run on the rail 2, the spherical cap 13 supports the spherical bearing 14 an order to limit the movement of the ball member 10 against the spherical bearing 14.

The container, according to the present invention, presents the following advantages:

It allows the transport at higher speeds of larger weights of materials and goods;

It presents a high degree of stability even in case of an uneven or asymmetrical distribution of load, no matter what the speed or the shape of the route;

It presents a low degree of wear of the rolling mechanisms, due to its construction that allows an even distribution of load on the rollers;

It contributes to an improved transport, free of noise and vibrations;

It presents a high degree of safety in transport;
It allows a more effective airtightness between the system container and transport tube due to the mobility of the container's packings.

I claim:

1. A pneumatic transport system comprising:
a tube;
an overhead rail in the form of an I-beam mounted within said tube; and
a vehicle riding along said rail, said vehicle comprising:
an elongated container suspended beneath said rail and displaceable therealong within said tube,
at least one vertical pivot mounted at an end of said container,
a horizontal pivot mounted on said vertical pivot for rotation therewith in a horizontal plane,
a pair of oppositely extending arms mounted on said horizontal pivot and rotatable thereabout in a vertical plane and rotatable therewith in a horizontal plane,
respective journal means provided at a free end of each of said arms, said journal means each including a first spherical surface affixed to the respective arm and a second spherical surface complimentary to the first and riding thereon,
a support mounted on each of said second surfaces,
a plurality of support rollers mounted on each of said supports and engaging a lower flange of said rail,
a plurality of first guide rollers vertically mounted on each of said supports and flanking the lower flange of said rail,
packing means mounted on said vertical pivot of said container forming a pneumatic barrier with said tube to enable said vehicle to be pneumatically displaced through said tube, and
a plurality of second guide rollers mounted on said container and normally spaced from the wall of said tube for engagement therewith only during lateral displacement of said container.

2. The system defined in claim 1 wherein:
said support rollers flank said rail and are vertically inclined thereto for automatically centering said vehicle within said tube, each of said support rollers being mounted on a respective lever rotatably mounted on a second horizontal pivot provided on said support and a spring between said lever and said support for providing shock absorbing means between said rail and said vehicle; and
said first guide rollers are downwardly tappered and normally spaced from the lower flange of said rail and are engageable therewith only during the downward displacement of said vehicle.

3. A pneumatic transport system comprising:
a tube;
an overhead rail in the form of an I-beam mounted within said tube; and
a vehicle riding along said rail, said vehicle comprising:
an elongated container suspended beneath said rail and displaceable therealong within said tube,
at least one vertical pivot mounted at an end of said container,
a horizontal support universally mounted on said vertical pivot,
a plurality of support rollers universally mounted on said support and engaging a lower flange of said rail,
a plurality of first guide rollers mounted on said support and flanking the lower flange of said rail,
packing means at an end of said container forming a pneumatic barrier with said tube to enable said vehicle to be pneumatically displaced through said tube, said packing means being spaced from the walls of said tube and mounted on said vertical pivot for displacement in a horizontal plane by a pin provided on said support and engaged by a fork provided on said packing means, and
a plurality of second guide rollers mounted on said container and normally spaced from the wall of said tube for engagement therewith only during lateral displacement of said container.

4. The system defined in claim 3 wherein said packing means comprises a plurality of flat flexible packing elements shaped to obturate the cross section of the transport tube in a closely spaced apart relationship with the interior surfaces thereof, said packing elements being spaced apart from one another to form a labyrinth.

* * * * *